United States Patent [19]
Söllner

[11] Patent Number: 5,884,173
[45] Date of Patent: *Mar. 16, 1999

[54] MOBILE RADIO SYSTEM WITH IMPROVED HANDOVER FACILITY

[75] Inventor: Michael Söllner, Erlangen, Germany

[73] Assignee: Lucent Technologies, Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 507,512
[22] PCT Filed: Dec. 19, 1994
[86] PCT No.: PCT/NL94/00322
 § 371 Date: Aug. 23, 1995
 § 102(e) Date: Aug. 23, 1995
[87] PCT Pub. No.: WO95/18513
 PCT Pub. Date: Jul. 6, 1995
[51] Int. Cl.$^6$ .................................................. H04Q 7/00
[52] U.S. Cl. ............................................ 455/436; 455/442
[58] Field of Search ................................ 379/60, 58, 59; 455/410, 436, 442, 104, 105

[56] References Cited

U.S. PATENT DOCUMENTS

| | | | |
|---|---|---|---|
| 5,090,051 | 2/1992 | Muppidi et al. | 455/410 |
| 5,289,525 | 2/1994 | Issenman et al. | 455/436 |
| 5,291,544 | 3/1994 | Hecker | 455/436 |
| 5,483,668 | 1/1996 | Malkamaki et al. | 455/442 |

FOREIGN PATENT DOCUMENTS

| | | | |
|---|---|---|---|
| 0544457A2 | 6/1993 | European Pat. Off. | H04Q 7/04 |
| 281111 | 9/1988 | Japan . | |
| 509548 | 10/1992 | Japan . | |

*Primary Examiner*—Dwayne D. Bost
*Assistant Examiner*—Myron K. Wyche

[57] ABSTRACT

In modem, modularly structured mobile radio systems, a call between a base station and a mobile subscriber station is to be handed over to a different base station the moment the mobile subscriber station leaves the coverage area of a base station. For this purpose, a switching system providing the route between a fixed network and the base stations is to carry out appropriate switching operations. In order to realise shortest possible dead times caused by interruptions during call handovers from one radio cell to another radio cell, a first and a further base station each comprise switching equipment for inserting a signal ($S_k$) coming from a switching center into a signal ($S_g$) going to the switching center.

12 Claims, 8 Drawing Sheets

MOBILE RADIO SYSTEM WITH IMPROVED HANDOVER FACILITY

BACKGROUND OF THE INVENTION

1. Field of the Invention

The invention relates to a mobile radio system comprising at least a first base station, at least a further base station and at least a switching centre.

The invention further relates to a base station, switching equipment and a detection and control arrangement for such a mobile radio system.

2. Discussion of the Related Art

In a mobile radio system there are provided a plurality of base stations for maintaining radio links to mobile subscriber units. A switching centre also referenced switching system in the following is used for establishing connections to the base stations allocated to the switching system. For a handover, the switching system comprises, for example, means which hand over, as required, a connection between the switching system and a mobile subscriber station existing via a first base station (call handover base station) to a second base station (call take-over base station).

Modem mobile radio systems currently comprise many individual radio cells which have each a limited coverage area. Each cell is supplied with radio signals by a base station, while the transmitter power of the base stations and of the mobile subscriber stations is adapted to the size of a radio cell. In this manner the same radio parameters (for example, frequencies, time slots or codecs) can be used in radio cells which are a specific distance apart, without having to take mutual interference into account.

While a base station is connected to mobile subscriber stations that are located inside its cell via a radio channel, the base stations themselves are connected to switching systems, for example, via cable transmission paths. The switching systems on their part are again connected to at least one fixed network, for example, the public telephone network (PSTN=Public Switched Telephone Network, or ISDN=Integrated Services Digital Network). Via the switching systems a mobile subscriber station can be linked to an arbitrary subscriber of the respective network (mobile originating call), or a subscriber of the respective network to an arbitrary subscriber of the mobile radio network (mobile terminating call). In the case of such a link, this may conventionally relate to a call link, but also to a data link, for example, for a facsimile transmission.

The moment a mobile subscriber station leaves the coverage area of a radio cell assigned thereto, there should be provided that the radio link to the mobile subscriber station is taken over by another radio cell i.e. by another base station. The occurrence of such a change of radio cells may be detected, for example, by measuring the signal field strength, the signal-to-noise ratio, the error probability, the distance between base station and mobile subscriber unit and so on. If such a situation is detected, both the radio link is to be handed over from one base station to the take-over base station and the transmission path between a network subscriber and the handover base station is to be switched to the take-over base station.

In a call handover method which is implemented, for example, in a GSM system, first a free radio channel is to be selected by the take-over base station. This channel is announced to the mobile subscriber station, so that the mobile subscriber station can maintain the radio link along the channel announced thereto. In other systems, for example, in DECT (Digital European Cordless Telecommunication), the selection of the new radio channel is made by the mobile station.

When the mobile station is changed to the new radio channel, also the link in the cabled part of the mobile radio system is to be switched over by appropriately driving the switching systems concerned. Then there is the problem that the radio channel and the switching systems are to be switched over substantially simultaneously, so that no perceivable pauses, for example, caused by clicking sounds, or even longer pauses, occur.

For this purpose, there has also been proposed to build up a conferencing circuit of the mobile subscriber with himself, that is, on the one hand, via the base station that hands over the call and, on the other hand, via the base station that takes over the call, so that there is always a link to the mobile subscriber, irrespective of the instant of switching. The cost of such conferencing circuits, however, is considerable. Furthermore, there is the problem that before the radio channel is switched over, the base station taking over the call, or after the radio channel has been switched over, the base station handing over the call, inserts a noise signal into the radio link that does not yet exist or no longer exists. This is tolerable, it is true, for call links, but, in the case of data links, this may lead to errors that can no longer be corrected.

EP 0 544 457 has disclosed a method for handling a call handover from a first base station to a second base station, in which the link from fixed-network subscriber to switching system is first led via a switch specially provided for the call handover before the radio channels are switched over. In preparation of the call handover, this switch completely establishes the connection path to the call take-over base station via the switching system to which the take-over base station is connected, including rendering the new radio channel available to the take-over base station. After this connection has been established, the handover base station announces to the mobile subscriber station that it is to change to the radio channel of the handover base station. Simultaneously, the switch is given the instruction to switch to the new connection already prepared. Subsequently, the previous connection to the take-over base station can be broken off via the switch.

In a special embodiment in which the (call) data are available as compressed time slot signals, the switch is arranged as a unit for time slot exchange. The advantage of the switch lies in the fact that, prior to the actual call handover, all connections are already prepared, and thus for a switch-over to the network only the time slot signals need to be switched over i.e. exchanged. Once an appropriate control signal has arrived at this switch, the switching may be effected without delay. In this manner the period of time in which the connection to and from the mobile subscriber station is dead is to be smaller than 150 ms.

This switching time may be acceptable for call links. For data transmission, however, a switching time of this order of magnitude is no longer acceptable.

SUMMARY OF THE INVENTION

It is an object of the invention to keep the dead time caused by a call handover shortest possible.

This object is achieved in that the first and the further base station include switching equipment for inserting a signal coming from the switching centre into the signal going to the switching centre.

The invention is based on the recognition that rather not the switching times in the individual components of the mobile radio system are problematic for a call handover, but longer dead times, caused by the fact that between recognizing the necessity of operating the switching system (=switching centre) and the execution, switch commands are to be transmitted with a finite delay. As not all of the switch commands arriving at a switching system can be executed forthwith, but, for example, are to be put in a queue, the length of this delay time also depends on other factors, for example, on the traffic load of the switching system. The delay time may thus vary considerably and even be longer than 150 ms under circumstances. In principle, it is of no importance to the function of the invention at which position between switching system and mobile subscriber station the switching equipment (switching means) is arranged. It is even possible to position the switching means in the switching system, as long as the requirement is fulfilled that the switching means are switched at a defined switching instant when a call is handed over. An advantageous embodiment of the invention provides, however, that the means for inserting a signal coming from the fixed network into the signal going to the fixed network are accommodated in the base station. In a further embodiment the means for detecting a call handover, which means control the coupling means, are also accommodated in the base station. In this manner the necessary modifications of an existing mobile radio system may be kept smallest possible.

The switching equipment (switching means) proposed by the invention may be arranged such that when the radio channel is switched over to, the switching operations take place substantially without delay. The invention is based on the idea of allowing real-time switching operations to be carried out autonomously by the switching means located in the line handing over the call and in the line taking over the call. In this manner the switching operation is subdivided into various sub-phases during a call handover, while real-time sub-phases are handled by the switching means, but the switching system is switched over in non-real-time sub-phases.

For embodying the invention it is a matter of the switching means being activated substantially simultaneously with a call handover i.e. with the actual change of radio channels. Therefore, it is advantageous to provide separate means for detecting the call handover, so as to influence the switching means directly i.e. without any time delay. Preferably, switching means and detecting means can be installed together, so that for the switching signal from the detector to the switching means no additional signalling need to be sent along a transmission path.

The control of a call handover may be ensured in that the switching equipment comprises a detection and control arrangement for detecting a request for a call handover and for controlling the insertion. A change of radio channels by the mobile subscriber may be detected, for example, in that no signal from the mobile subscriber arrives at the base station that hands over the call, or that a signal is received in the base station that takes over the call, respectively. For detecting a signal received in digital radio systems it is especially useful carrying out measurements of the received field strength and/or bit error rate.

The signal coming from the switching centre can easily be inserted into the signal going to the switching centre in that the switching equipment comprises switching means for serially connecting the first and the further base station. This serial connection of the first and the further base station makes it possible to realise a substantially seamless call handover by merely implementing measures lying within the range of the network infrastructure of the mobile radio system i.e. only the base stations need to be modified, while a substantially seamless handover with already existing subscriber stations is possible, thus modifications in the subscriber stations are not necessary.

There are various possibilities, in principle, including additional switching means in the switching system, to carry out the henceforth non-real-time switching operations in the switching system. The invention is especially advantageous in that the switching centre comprises switching means which are provided for separately switching through the signal coming from the switching centre and the signal going to the switching centre when a call handover is effected. Consequently, for effecting a call handover, an incoming and an outgoing line are switched separately in the switching system, so that no additional switching means in the switching system are necessary, but only the operating program of the switching system needs to be modified accordingly. The otherwise customary pairwise line switching in a switching system is performed in two separate switching operations. Before the final (pairwise) switching operation, an incoming transmission line of one line circuit (for example, the line circuit coming from the base station that hands over the call) is connected to the outgoing transmission line of the other line circuit (for example, of the line circuit leading to the base station that takes over the call). In this manner a loop in the switching system is closed between the line circuit that hands over the call and the line circuit that takes over the call.

An advantageous multistage call handover may be effected in that, in a first step, the switching means of the switching centre and the switching means of the switching equipment of the further base station are provided to switch a send signal coming from the fixed network and to be sent to a mobile station through to the first base station via the further base station after a request for a call handover, in that, in a second step, the switching means of the switching equipment of the first and of the further base station are provided to switch a receiving signal for a call handover received from the mobile station through to the further base station via the first base station, and in that, in a third step, the switching means of the switching centre are provided to switch the receiving signal received from the mobile station through to the fixed network.

These and other aspects of the invention will be apparent from and elucidated with reference to the embodiments described hereinafter.

DETAILED DESCRIPTION OF THE PREFERRED EMBODIMENT

Figure 1A:
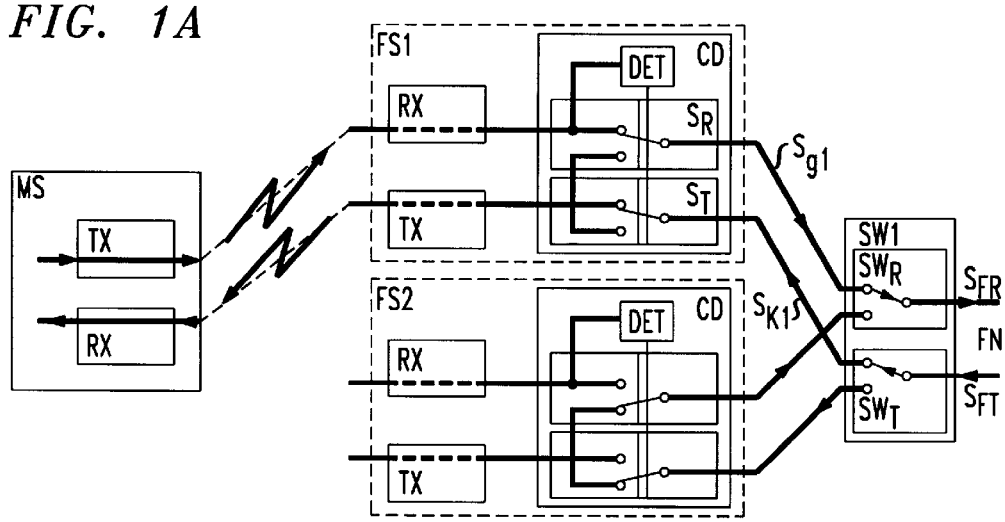
FIGS. 1a, b, c show an illustrative embodiment for a mobile radio system comprising three different phases of a call handover.
Figure 1B:
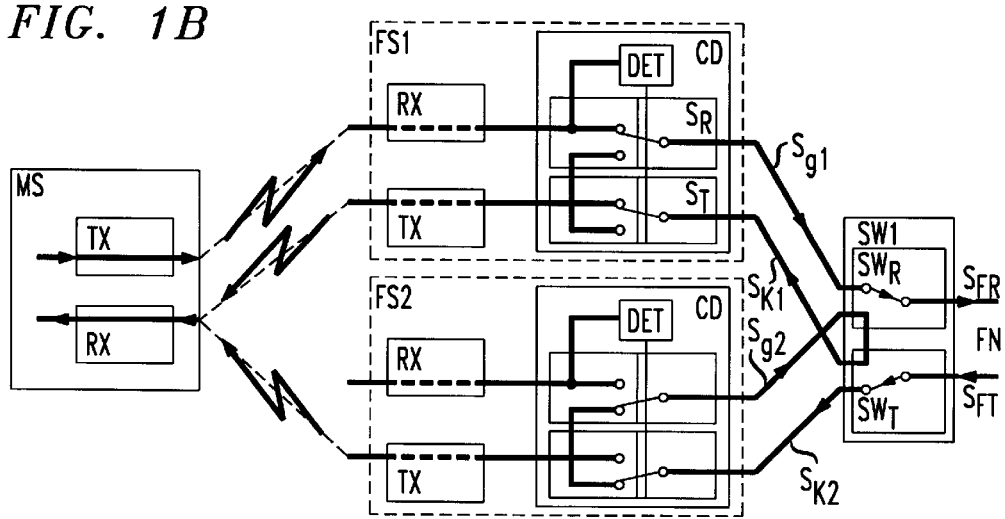
Figure 1C:
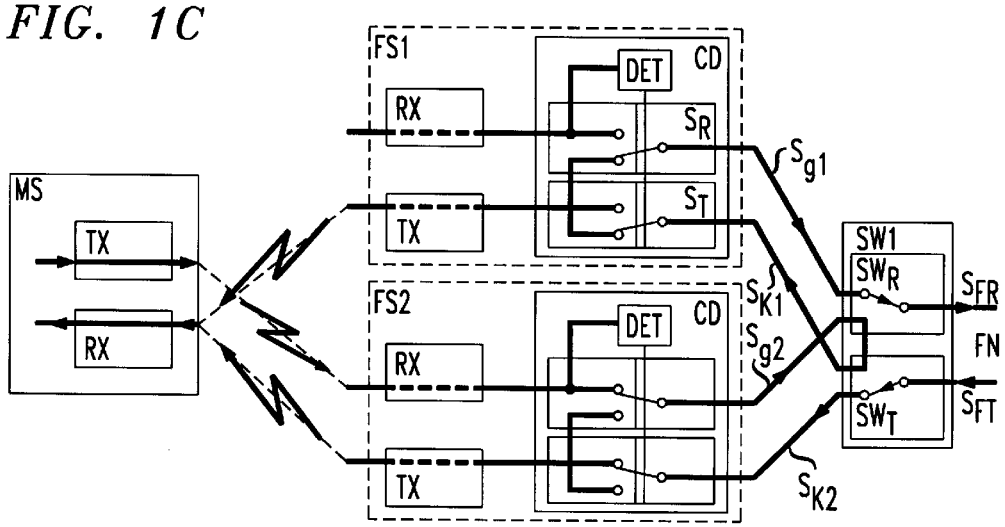

FIGS. 1a, 1b, 1c show illustrative embodiments for a mobile radio system comprising three different phases of a call handover. The mobile radio system shown in the drawing FIGS. 1a, 1b, 1c comprises a first base station FS1, a further base station FS2, a switching centre SW1 as well as a mobile station MS. In the illustrative embodiment shown in the drawing FIGS. 1a, 1b, 1c are shown only the parts of the mobile radio system that are relevant to the invention. For example, the transmitting section of the mobile station and of the first and further base station FS1, FS2 are referenced TX, whereas the receiving sections are referenced RX. The first and the further base station FS1, FS2 additionally comprise each switching equipment CD which includes switching means $S_R$, $S_T$ as well as a detection and control arrangement Det for controlling the switching means $S_R$, $S_T$. The switching centre SW1 comprises switching means $SW_R$, $SW_T$ which are provided for separately switching through the send signal $S_{FT}$ coming from a fixed network FN or a signal $S_{FR}$ transmitted to the fixed network. A signal coming from the switching centre SW1 and arriving at the first base station FS1 is referenced $S_{k1}$, whereas the signal going from the first base station FS1 to the switching centre SW1 is referenced $S_{g1}$. Accordingly, the signals in FIG. 1b or FIG. 1c between the further base station FS2 and the switching centre SW1 are referenced $S_{g2}$ and $S_{k2}$.

The object of the switching means $S_R$, $S_T$, $SW_R$, $SW_T$, $SW_{RT}$ in the further base station FS2 and in the switching centre SW1 is to establish a serial connection of the first base station FS1 and the further base station FS2. When a call is handed over then, the signal $S_k$ coming from the switching centre SW1 and the signal $S_g$ going to the switching centre SW1 are then to be switched through separately. This provides a multistage switch-over during the call handover, which will be further explained in the following with reference to the various switch-over phases shown in the drawing Figures 1a to 1c.

FIG. 1a shows the phase in which the mobile station MS is located within reach of the first base station FS1 assigned to a first cell. For this purpose, the switching means $SW_R$, $SW_T$ of the switching centre SW1 are arranged in such a way that the send signal $S_{FT}$ coming from the fixed network FN and destined for the mobile station MS is switched as an incoming signal $S_{k1}$ to the transmitter TX of the first base station FS1. The transmitter TX of the first base station FS1 transmits this signal to the mobile station MS which is symbolized by the arrow pointing towards the mobile station MS. Similarly holds for the reverse direction of transmission i.e. a send signal transmitted by the transmitter TX of the mobile station MS is received by the first base station FS1 via the receiver RX and transferred as an outgoing signal $S_{g1}$ via the switching centre SW1 as a receiving signal $S_{FR}$ to the fixed network FN.

When the mobile station MS gradually moves outside the range of the cell which is covered by the first base station FS1 into the direction of the cell covered by the further base station FS2, for example, on the basis of a "handover required" command as described with respect to the FIG. 5, the switching centre SW1 no longer directly transfers the send signal $S_{FT}$ coming from the fixed network to the first base station FS1, but the switching means $SW_T$, $SW_{RT}$ are moved to such a position that the send signal $S_{FT}$ is transferred to the further base station FS2 as a signal $S_{k2}$ coming from the switching centre SW1, whereas the switching means $S_T$, $S_R$ of the switching equipment CD of the further base station FS2 are arranged such that send signal $S_{FT}$ is transferred both to the transmitter TX of the further base station FS2 and, as an outgoing signal $S_{g2}$, to the switching centre SW1. The switching means $SW_{RT}$ of the switching centre SW1 transfers this signal as an incoming signal $S_{k1}$ to the transmitter TX of the first base station FS1. In the phase of the call handover shown in FIG. 1b there is thus a serial connection of the first and the further base station FS1, FS2 for the send signal $S_{FT}$.

FIG. 1c shows the serial connection of the base stations FS1, FS2 during the call handover, after the mobile station has switched over to the further base station FS2. In this operating state, the send signal $S_{FT}$ coming from the fixed network FN is switched through as an incoming signal $S_{k2}$ to the transmitter TX of the further base station FS2 and transmitted by that base station to the mobile station. The signal transmitted by the transmitter TX of the mobile station MS to the further base station FS2 is received by the receiver RX of the further base station FS2 and switched through via the switching means $S_R$ of the switching equipment CD as an outgoing signal $S_{g2}$ to the switching centre SW1 and, via the switching means $SW_{RT}$, as an incoming signal $S_{k1}$ coming from the switching centre to the first base station $FS_1$. The switching means $S_T$, $S_R$ of the switching equipment CD of the first base station FS1 are switched in such a way that this signal $S_{k1}$ is transferred as an outgoing signal $S_{g1}$ from the first base station FS1 to the switching centre SW1 and is transferred from there via the switching means $SW_R$ as a receiving signal $S_{FR}$ to the fixed network. In a last step the switching means $SW_{RT}$ as well as the switching means $SW_R$ of the switching centre SW1 are switched in such a way that the signal $S_{g2}$ going from the further base station FS2 to the switching centre SW1 is fed directly to the fixed network FN as a receiving signal $S_{FR}$. This is no longer specifically shown in FIGS. 1a to 1c.

The principle of a call handover proposed in the FIGS. 1a to 1c may also be carried out in existing mobile stations, because no modifications of the mobile stations are necessary. Modifications for such a handover are only necessary in the network infrastructure, in that the mobile stations take part in a handover, can be arranged in a serial connection. This serial connection comprises a duplex channel which can be separately switched for send and receive directions and thus supplies the same information to all the base stations that take part. The network configuration proposed in FIGS. 1a to 1c is dynamically allocated in several network nodes (switching equipment CD, switching centre SW1) by conventional one-way switches. Compared with network configurations known thus far, only the switching equipment CD with the switching means $S_R$, $S_T$ is necessary, which make the transfer in the downlink and uplink directions in the base stations FS1, FS2 possible. As a result, the base station FS1 becomes transparent to data supplied by the network.

With the configuration proposed in FIGS. 1a to 1c, when a handover is initialized, all the base stations are supplied with the same downstream data which may also be fed to the respective downlink channels. Only in the serving base station FS1, the switching means $S_R$, $S_T$ are open in this operating phase (compare FIG. 1b) between downlink and uplink, so that in the first base station FS1 a continuable uplink signal can be detected, which causes the take-over base station FS2 to connect the terrestrial channels to the respective radio channels.

When the mobile station MS receives the command to change to the new radio channel of the take-over base station FS2, it may accordingly access this channel in synchronism or out of synchronism. At this moment the base station FS1 handing over the call will lose the signal of the mobile station MS which causes the uplink/downlink connection of the switching equipment CD of the base radio station FS1 to be connected through (compare FIG. 1c). In the mean time the former destination base station will detect that the mobile station FS occupies the assigned channel and will thus immediately switch the channels through. The result of this multistage switching operation as shown in FIGS. 1a to 1c is an instantaneously switched radio path without delay times and without ambiguous channel combinations. On the whole, the proposed handover considerably improves the transmission quality even for data transmissions.

The FIGS. 1a to 1c show a handover taking place between two base stations FS1, FS2 which are both assigned to the same switching centre SW1. In the case where a handover takes place between a base station, a first switching centre and a base station that is assigned to a further switching centre, it is necessary to perform the same switching operations as are necessary in the illustrative embodiments described with respect to FIGS. 1a to 1c in the base stations that take part. Only in the participating switching centres of the handover and take-over base stations is it necessary in this case to arrange respective transmission paths, so that the principle shown in FIGS. 1a to 1c of a serial connection of the call handover and the call take-over base station can take place.

Figure 2:
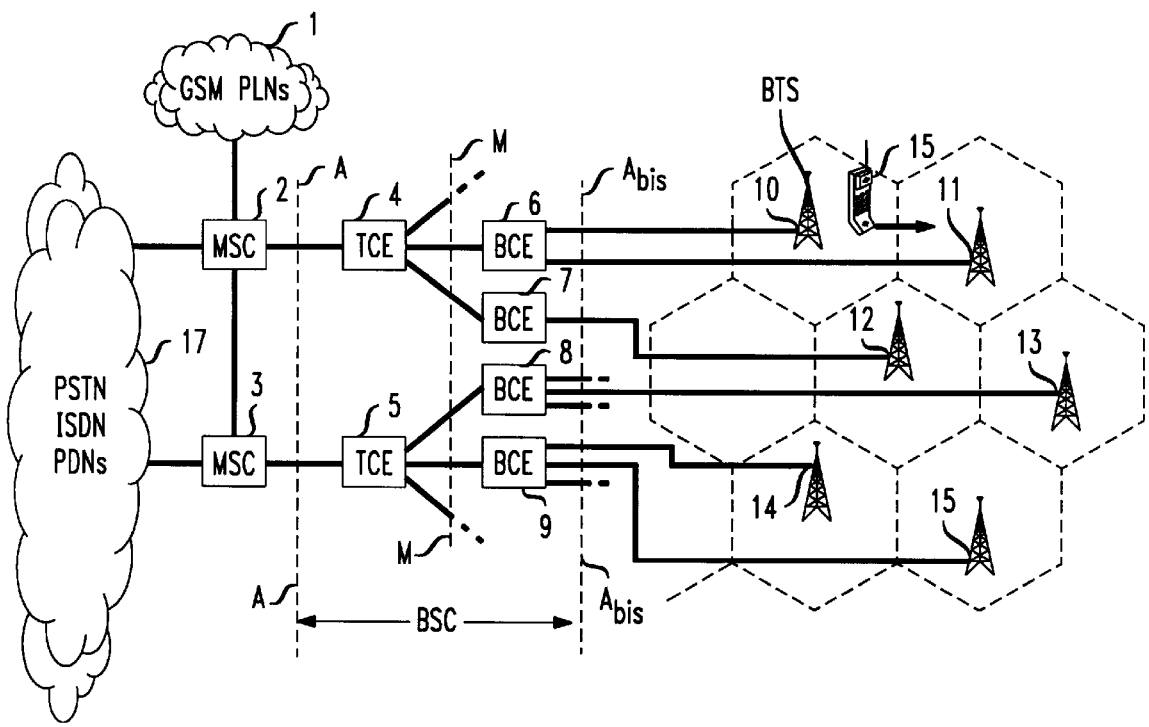
FIG. 2 shows the structure of a cellular mobile radio system.

FIG. 2 shows the structure of a cellular mobile radio system. As an illustrative embodiment was selected the GSM system (Global System for Mobile Communication) already operated in Europe. A survey of this mobile radio system is to be found in EP 0 544 457 mentioned before. As the GSM network is sufficiently known to a person skilled in the art, the GSM network will only be discussed in detail in the course of the description of the invention in so far this is necessary for understanding the invention. Furthermore, the invention is obviously not restricted only to the GSM network, but also suitable for all other mobile radio systems in which a call handover takes place.

The skeleton of the GSM network is formed by mobile switching centres MSC 2, 3 which are mutually connected via data lines. The mobile switching centre MSC is a high-efficiency digital switching centre which establishes both the transition between the GSM network 1 and other telecommunication networks such as, for example, a public telephone network 17 (PSTN), the ISDN network, and so on, and manages the GSM network 1. One or more base station controllers BSC are connected to each mobile switching centre MSC. The base station controller BSC in its turn manages one or more base stations 10 . . . 15 (BTS) while each base station BTS serves a radio cell. For establishing the respective connections between the mobile switching centre MSC and each base station BTS, each base station controller BSC comprises a further switch. For the principle of the invention it is not necessary to make a distinction between mobile switching centre MSC and base station controller BSC.

The transition from the mobile switching centre MSC to the base station controller BSC is normalized as a so-called A-interface. The A-interface provides the known PCM30 data format, so that PCM30 transmission links suitable for data transmission can be used. The PCM30 signal is a time-division multiplex signal in which 30 data signals, for example, digitized telephone signals, are compressed at a data rate of 64 kbit/s to a 2.048 megabit/s bit stream. To this end the PCM 30 frame is subdivided into 32 time slots of 8 bits each. The first time slot (number 0) contains an identification of the beginning of the frame, the $17^{th}$ time slot (number 16) is used for signalling the data channels accommodated in the remaining 30 time slots.

For the first configuration layer of the GSM system, a speech coding was selected in which a 260-bit-long data block is formed based upon the known LPC technique (LPC=Linear Predictive Coding) linked with a long-term prediction (LTP) and a coding of the residual signal by a sequence of pulses in a regular time pattern (RPE—Regular Pulse Excitation) for speech samples lasting 20 ms each. This corresponds to a data rate of exactly 13.0 kbit/s. In contrast, in the cable telephone network, a pulse code modulation (PCM) at a data rate of 64 kbit/s is customary for the digital transmission of speech signals. For encoding PCM signals into GSM signals and vice versa, there is provided transcoder equipment (TCE). The 260 coherent bits of a 20-ms-long speech sample will be referenced net bits in the following, because they do not contain any further information. These net bits are extended by additional control bits and empty bits to a total of 320 bits and thus form a so-called TRAU frame (TRAU—Transcoding Rate Adaptation Unit). The data rate of the TRAU frame is thus exactly 16 kbit/s.

For the implementation of the invention it is advantageous, albeit not strictly necessary, that a type of payload signal coding is used between switch and participating base stations.

Although in GSM the transcoder equipment TCE 4, 5 forms a logical part of the base station controller BSC, this equipment may be located at various positions, for example, even at the mobile switching centre MSC. On the transmission paths between the transcoder equipment TCE and the base station central equipment BCE 6, . . . , 9, in this manner only one quarter of the transmission capacity is necessary, because each PCM30 channel having a rate of 64 kbit/s can simultaneously accommodate four TRAU signals at 16 kbit/s. Since the distance between mobile switching centre MSC and base station central equipment BCE may be more than several 100 km, it is possible to save on transmission cost in this manner.

For transmitting data between the base station central equipment BCE and the individual base stations BTS (so-called $A_{bis}$ interface), also a PCM30 frame is provided, while the PCM30 frame contains logical sub-channels, so that 16 kbit/s transmission capacity is available for each traffic channel.

Figure 3:
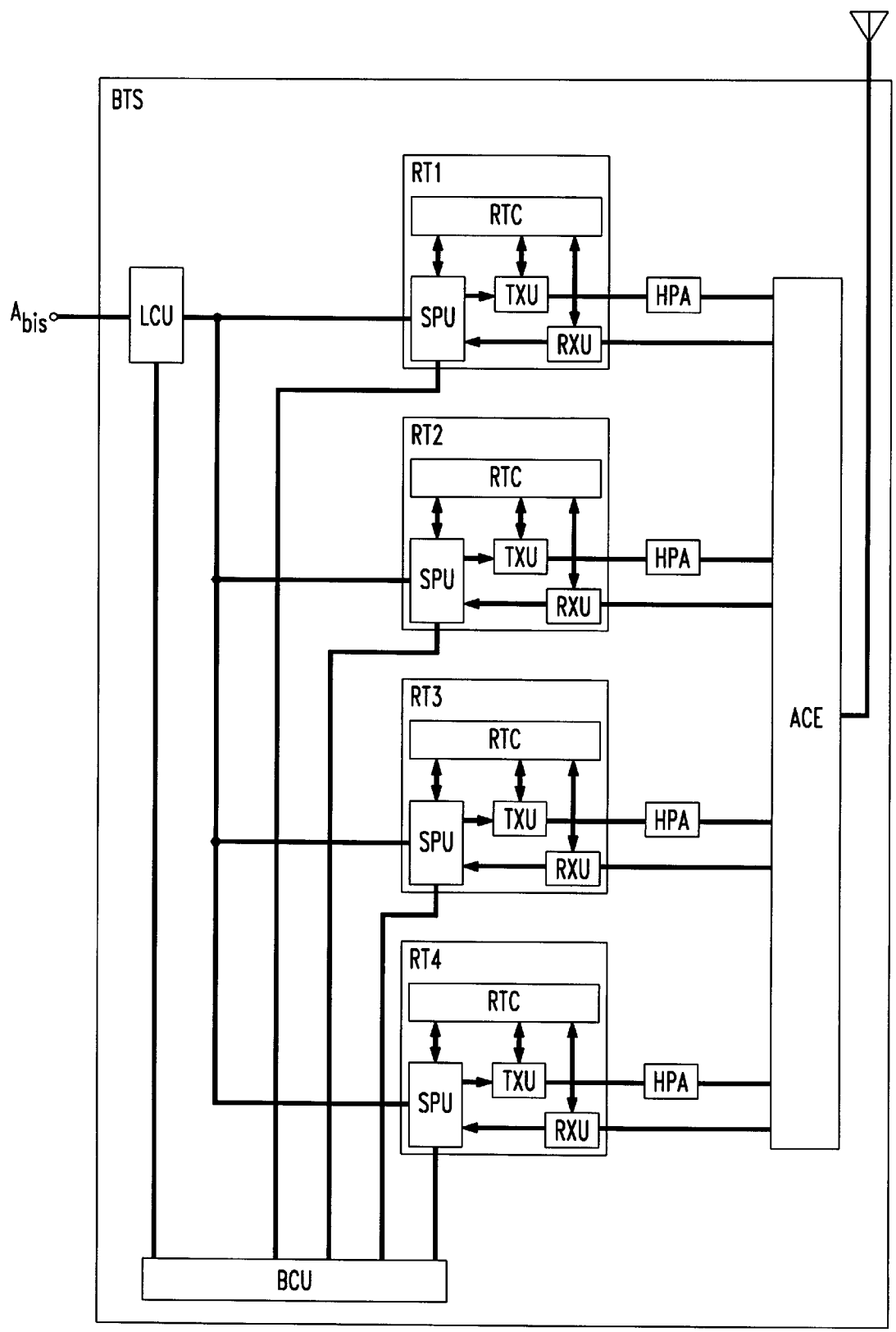
FIG. 3 shows an illustrative embodiment for a base station for a mobile radio system.

FIG. 3 shows the diagrammatic structure of a base station BTS. In a line concentrator unit LCU, payload signals and control signals in the data stream coming in via the $A_{bis}$ interface are separated. The payload data coming in over an internal data bus of the base station BTS are distributed over individual radio terminals RT1 . . . RT4, while each radio terminal RT has its own radio frequency. As the GSM system is conceived as a TDMA system having eight time slots for one frequency, one radio terminal RT can provide eight transmission channels. A signal processing unit SPU arranged in the radio terminal RT forms time slot send signals from the respective payload data, which signals are modulated in a transmitter unit TXU on a HF carrier also generated in the transmitter unit and are brought, as required, to an appropriate output transmitter power in a high power amplifier HPA. Via antenna coupling equipment ACE, the send signals from all the radio terminals RT of a base station BTS are combined to a single send signal.

The signals received from an aerial are selected according to frequency in the receiver unit RXU of the radio terminal RT and transformed into complex, digital baseband signals. The baseband signals are decoded in the signal processing unit SPU and combined to a continuous data stream and transmitted via the internal data bus and the line concentrator unit LCU via the $A_{bis}$ interface to BCE (compare FIG. 2).

The receiver unit RXU further measures the respective receive field strength of the received signal and transfers the received field strength to a radio terminal controller RTC. When the received signal is decoded, the signal processor SPU also determines the bit error rate and derives therefrom a quality information signal. The radio terminal controller RTC collects the quality information of the received signal and the received field strengths and computes a mean value thereof. These data which are important to the handover decision are transferred to the line concentrator unit LCU separately from the payload data and transmitted in a signalling channel of their own to the base station controller BSC (see FIG. 2).

For generating a central clock signal, each base station further includes an internal control unit BCU (BTS-central unit).

Figure 4:
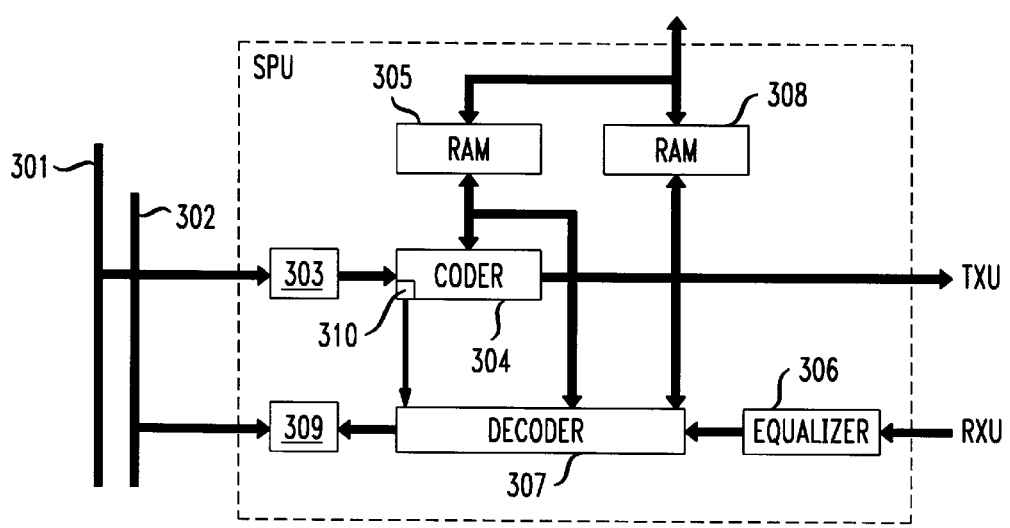
FIG. 4 shows the diagrammatic structure of a signal processing unit of a base station, and FIGS. 5a to 5j give diagrammatic representations of a further illustrative embodiment of a mobile radio system with various phases of a call handover.

FIG. 4 shows the basic structure of a signal processing unit SPU. The internal data bus of the base station BTS is formed by a first data bus 301 which carries the data signals arriving via the $A_{bis}$ interface, and a second data bus 302 which carries the data leaving via the $A_{bis}$ interface. A coder 304 included in the signal processing unit SPU controls a first interface 303, so that the data destined for a respective radio channel are taken over by the internal data bus 301. The data that have been taken over are buffered in a first memory 305 by the coder 304 in accordance with the respective radio channel i.e. in accordance with the time slot in which they are to be transmitted. For this purpose, the payload data still available in the TRAU frame are extracted. The coder 304 adds additional data bits to the 260 bits of a 20 ms speech sample for an error detection and this total is expanded to 456 bits via a convolutional coding, which provides considerable protection against transmission errors. From these 456 bits are formed eight sub-blocks of 57 bits each. In each time slot are transmitted a sub-block of a TRAU frame and a respective sub-block of the next TRAU frame, so that after eight TDM frames a total of two TRAU frames are transmitted. This interleaving spreads the gross bits of a 20 ms speech sample over eight successive TDMA frames, so that the signal becomes less sensitive to brief disturbances, but the resultant transmission delay, however, does not become too large. Similarly, also signalling data having a net length of 184 bits are transmitted in gross lengths of 456 bits.

To form time slot signals, the coder inserts between the transmit sub-blocks which have 57 bits each a training sequence that contains a specific 26-bit-long bit pattern as well as two further signalling bits (stealing flags), and three more initial and end bits at the beginning and end of the time slot signal. The data block formed in this manner for each of the eight time slots and lasting 148 bits is sent on time to the transmitter unit TXU by the coder 304.

The received signals baseband-coded by the receiver unit RXU are converted in an equalizer 306 into sample values for each bit to be decoded. A decoder 307 computes from these sample values the received data blocks for each time slot, de-interleaves the sub-data blocks and forms therefrom TRAU frames again. For timely transmitting these TRAU frames via a second interface controller 309, the computed TRAU frames are buffered in a second memory 308.

Certain commands transmitted to the mobile radio station are so-called transparent data i.e. the base station transmits these data to the mobile station without evaluating these data. Such a transparent command is also called a handover command which is sent by the base station controller BSC to the mobile station to instruct the mobile station to continue the transmission over another radio channel, that is to say, in another radio cell. The structure of the handover command is laid down in GSM Recommendation 0.4.08, chapter 9.1.14. On the basis of a specific bit pattern at the respective locations in the handover command, the handover command may be unambiguously distinguished from other control commands. For example, the second byte denoting the message type has the bit sequence "0010111". The handover command further contains important data for the mobile station, such as, the radio channel to be used.

In the illustrative embodiment, the coder 304 is arranged in such a way that it is capable of detecting a handover command on the basis of the particular bit sequence. The coder 304 is further arranged so that the moment it has detected a handover command for a specific radio channel i.e. for a specific time slot, it transmits the number of this time slot to the decoder 307. The decoder 307 in the illustrative embodiment is arranged in such a way that each time a received TRAU frame from the second memory 308 should be transferred to the interface 309, the decoder does not use this frame, but the TRAU frame received from the base station controller BSC and buffered in the first memory 305.

Thus, the moment a handover command is detected, in lieu of the TRAU frames received from the mobile subscriber for the respective radio channel, the TRAU frames coming from the base station controller BSC and intended for the mobile subscribers are returned to the base station controller BSC. Other criteria for using these procedures are, for example, the evaluation of signals received from the mobile radio station especially with respect to contents, receiving level or receiving quality.

When a call handover is required by its base station controller BSC, the base station taking over the call selects a free radio channel and waits until the mobile subscriber station reports itself on this radio channel. In the illustrative embodiment the decoder 307 is arranged in such a way that, from the moment a new radio channel is rendered available for a call handover until a handover access is detected, the mobile station returns to the respective base station controller BSC all the TRAU frames received from the coder 304 for this radio channel. The moment the decoder 307 detects a valid access to this radio channel, the data received from the mobile subscriber station are conventionally transmitted in TRAU frames to the base station controller. In this way the data stream intended for a specific radio channel and coming from a base station controller is returned to the base station controller in lieu of data (not yet) received from a mobile station.

In the following the cooperation of the depicted embodiments of the base stations and a switching system included therein will be described for the case of a call handover. The mobile station continuously measures the level and quality of the signals which are received from its own base station as well as from neighbouring base stations. The evaluated data are sent to the base station controller BSC by the mobile station. Irrespective of this, also the base station BTS measures the level and receiving quality of the mobile stations which values are then sent to the respective base station controller. In addition, the GSM system also provides a measurement of the distance from the mobile station to the base station. In either case the base station controller processes the data and decides whether a call handover is to be effected or not. If the call handover is to take place, the respective base station controller BSC computes the preferred base station to which the call is to be handed over.

Depending on which base station controller the handover base station and the take-over base station are connected to, the described mobile radio network has different procedures for the call handover. If a call handover base station and a call take-over base station are connected to the same base station controller such as, for example, the base stations 10 and 11 in FIG. 2, this is referenced an Intra BSC handover. Only the switch found in the common base station controller 6 takes part in the call handover. In the case of a call handover for which the call handover base station (for example, BTS 10) and the call take-over base station (for example, BTS 12) are connected to different pieces of base station central equipment (for example, BCE 6 and BCE 7), the call is handed over while use is made of the mobile switching centre (MSC 2) and is referenced an Inter BSC handover. The cases may then be distinguished where the participating base station controllers BSC are connected to the same mobile switching centre MSC and where the base station controllers BSC are connected to two different mobile switching centres MSC (for example, a call handover from the base station 12 to the base station 14 in FIG. 2). The call is then handled via the two mobile switching centres (MSC 2 and MSC 3).

Substitutionally for all said call handovers, there will be discussed in the following a call handover from a base station BTS-A to a base station BTS-B while use is made of only a single mobile switching centre MSC.

In this context each phase of the call handover is described with reference to FIGS. 5a–5f, while for clarity only the call paths within a switch SW, or the transmission paths which are rendered available in that call handover phase of the mobile radio system, or are actually necessary, are shown. For clarity, all the described, necessary arrangements, such as transcoder equipment TCE, switch in the base station controller BSC, line concentrator unit LCU and so on, as well as the channels along which the signalling among the stations is controlled, are omitted.

FIGS. 5a–5f symbolically show the coupling means for feeding back a data stream received from a base station, from its assigned base station controller, intended for a specific mobile subscriber on the pairwise assigned return channel from the base station to its base station controller, as a coupling device CD.

Figure 5A:
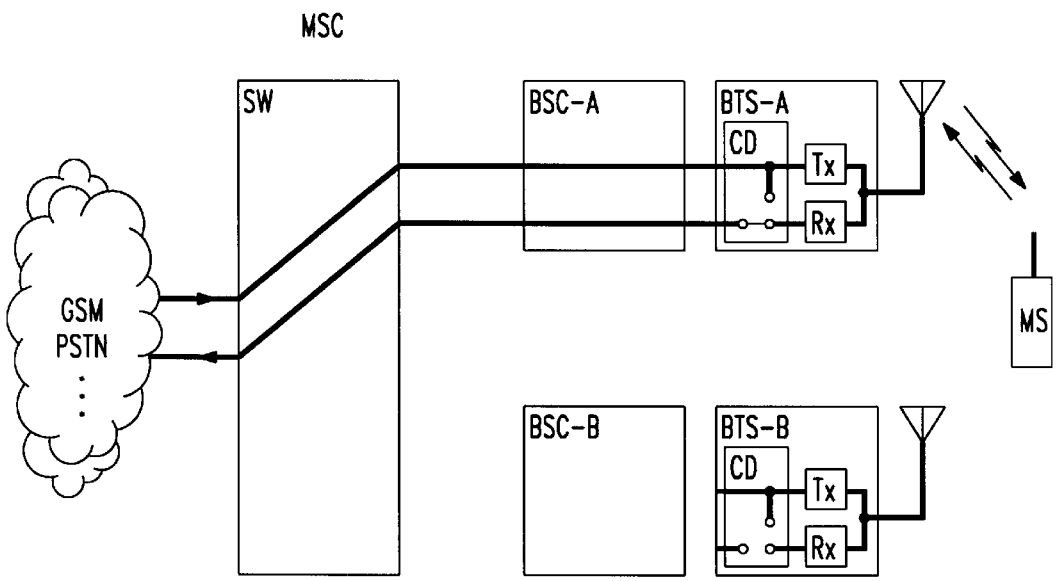
Figure 5B:
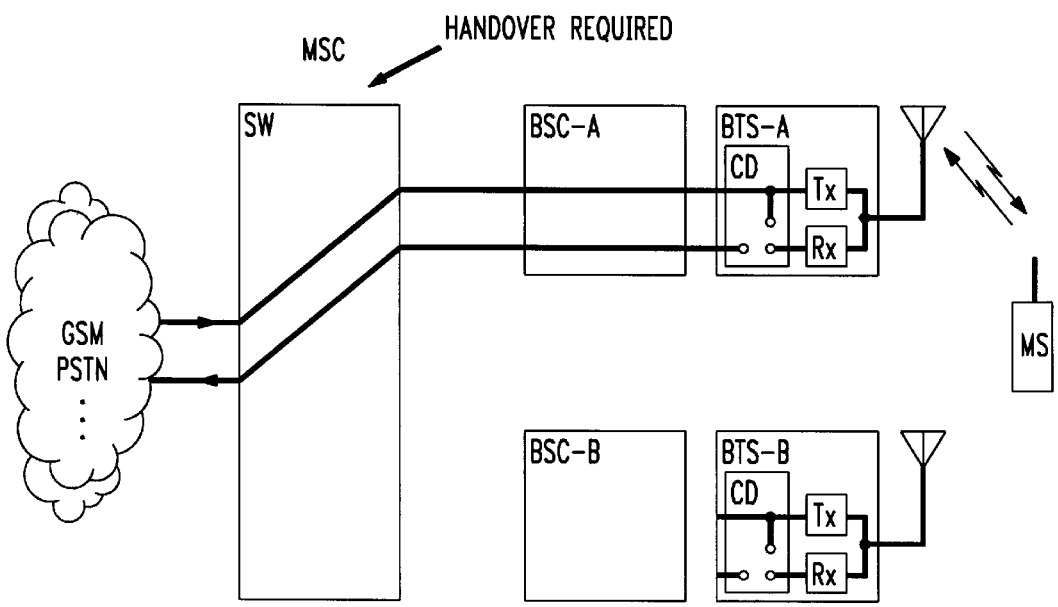

FIG. 5a shows an existing link from a network subscriber via a mobile switching centre MSC, a base station controller BSC-A and a base station BTS-A to a mobile station MS. Once the base station controller BSC wishes to introduce a call handover, it sends the corresponding command "handover required" to its mobile switching centre MSC (FIG. 5b).

Figure 5C:
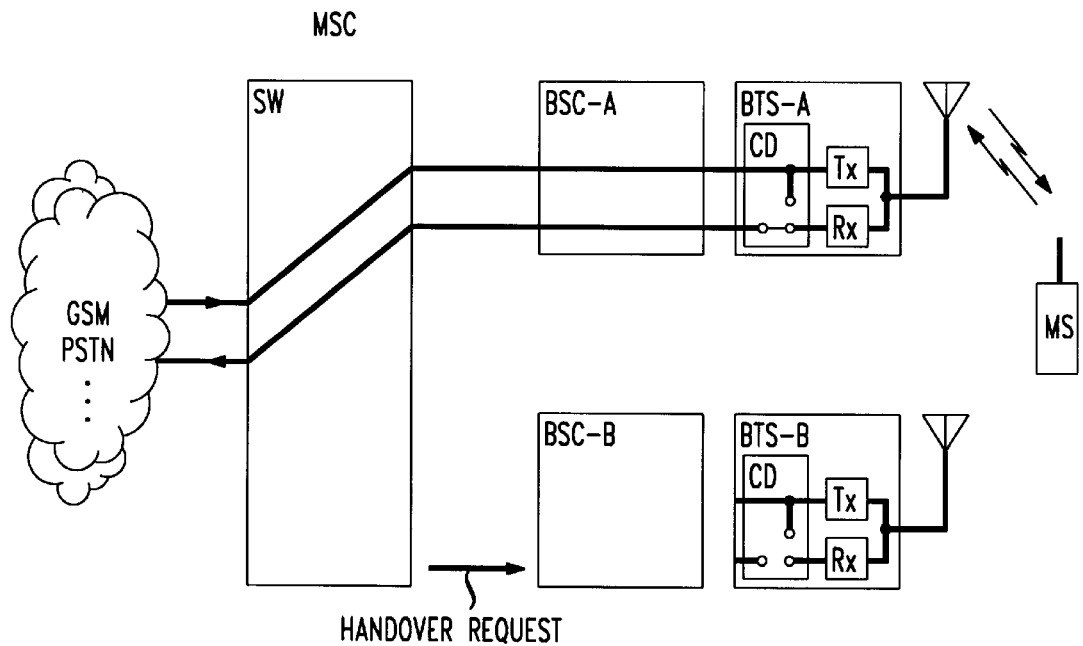

In the message "handover required" is included a list of base stations to which the call is to be handed over. The respective mobile switching centre MSC then determines via what base station controller BSC what base station BTS is preferably to be accessed for the call handover. This base station controller BSC-B then comes out with the request for a call handover via a "handover request" command (FIG. 5c).

Figure 5D:
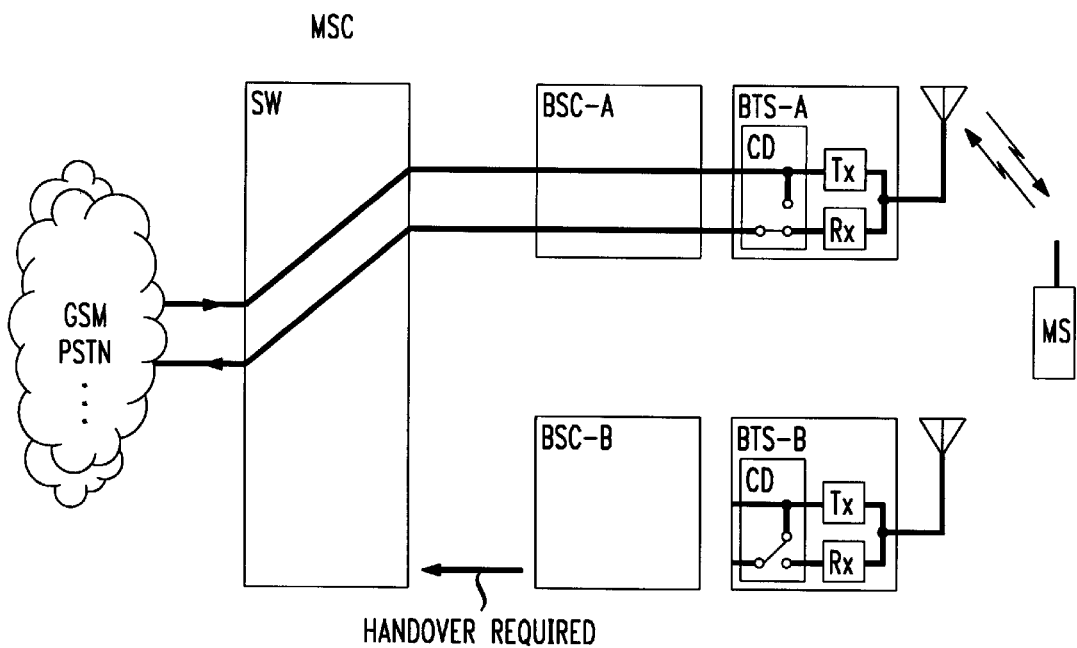
Figure 5E:
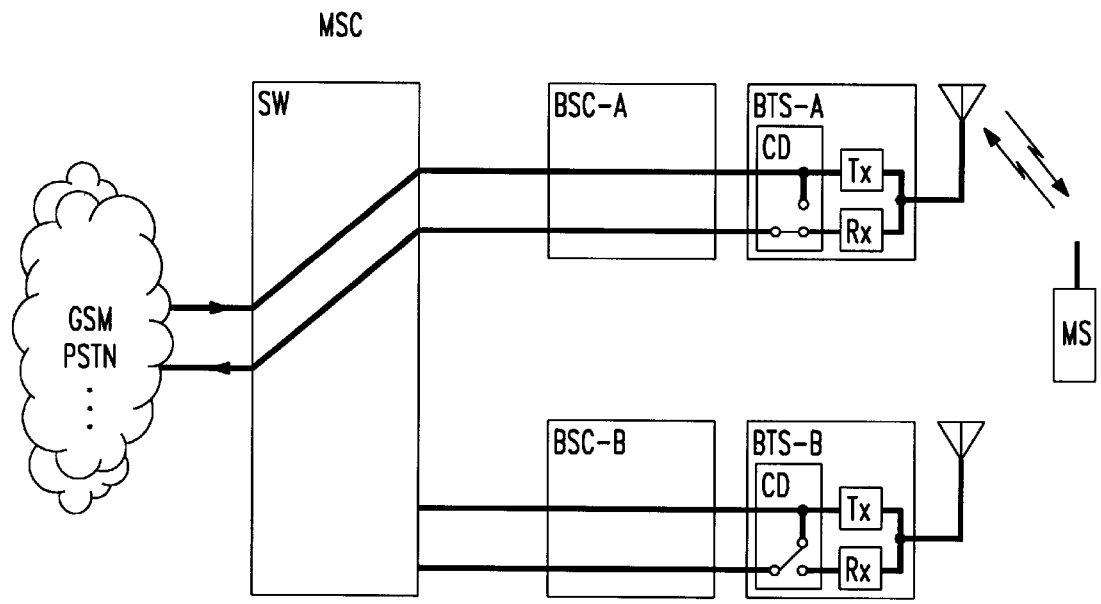

In the base station controller BSC-B which takes over the call is then searched for a free channel in the base station BTS-B and this free channel is reserved for the call handover. The coupling device CD assigned to this newly selected radio channel is switched in such a way that a signal coming in by this channel addressed to the take-over base station BTS-B from the take-over base station controller BSC-B is sent back to the take-over base station controller BSC-B. Together with the reservation of the radio channel sent to the take-over base station BTS-B, the take-over base station controller BSC-B sends back an acknowledge command "handover request acknowledge" to the mobile switching centre MSC (FIG. 5d). When the acknowledgement "handover request acknowledge" is received, the MSC lays out the transmission path to the call take-over base station BTS-B (FIG. 5e).

Figure 5F:
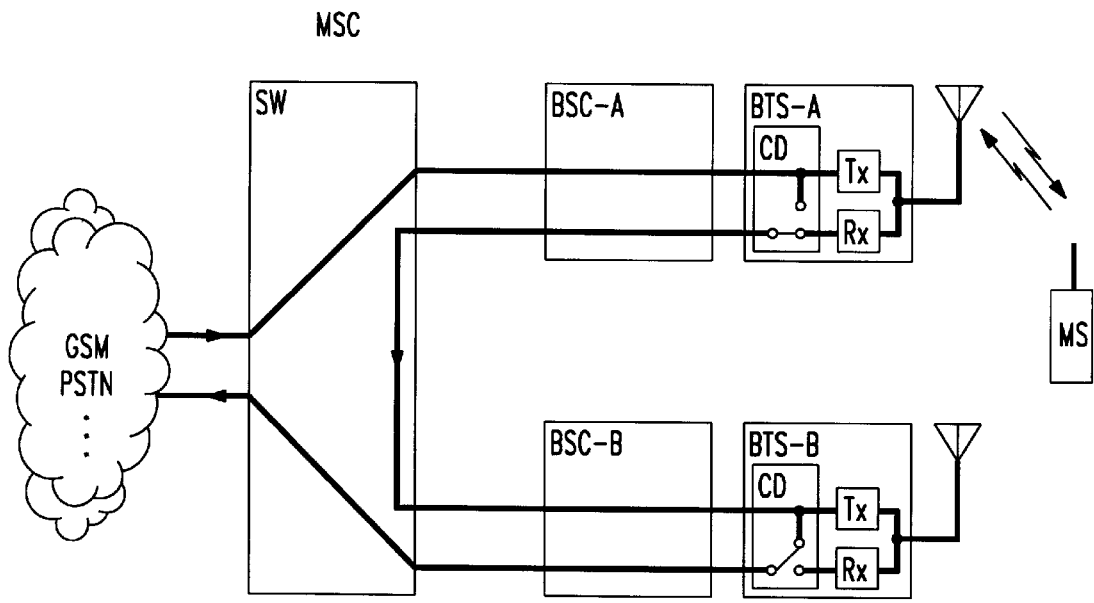

Furthermore, in the mobile switching centre MSC the call handover is prepared by a corresponding switching operation in the switch SW. For this purpose, the original link in the switch, by which link the signal coming from the mobile subscriber MS was transferred to the network subscriber, is stopped and instead, the signal received from the mobile subscriber is taken via the switch SW to the prepared channel to the base station BTS-B which takes over the call. The receiving path of the prepared radio channel is led to the network subscriber. As a result of the previous position of the coupling device CD in the base station BTS-B which takes over the call, the signal coming from the mobile subscriber MS is thus first, prior to being transmitted to the network subscriber, carried by the prepared link in the switch to the take-over base station BTS-B, and returned to the switch SW of the mobile switching centre MSC by the switched coupling device CD (FIG. 5f).

As the data stream is looped through, a continuous link between the subscribers is ensured up to the switching operation itself. As the switching times in the switch SW are very brief, information can hardly be lost when the switch is changed over. It is essential for the switching operation in the switch SW in preparation of the call handover that the formation of the loop is terminated by the coupling device CD in the take-over base station, before the described change of position takes place in the switch SW of the mobile switching centre MSC. Once these conditions have been fulfilled, the actual instant at which the change of the switch SW takes place is unimportant. Even rather long delay times between the arrival of the switch command and the execution of the switch command do not lead to noticeable dead times because of the continuous link of the subscribers.

Figure 5G:
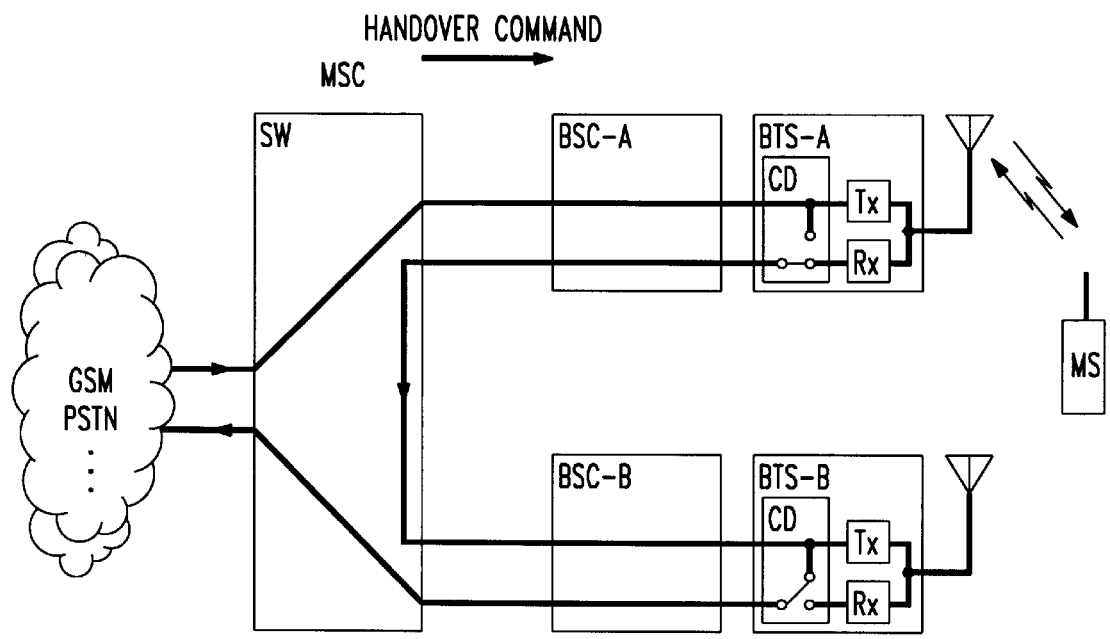

After the switch of the mobile switching centre MSC has made the described change, the mobile switching centre sends out the handover command to the base station controller BSC-A handing over the call (FIG. 5g). As already described, this command is given to the base station and sent to the mobile station MS.

Figure 5H:
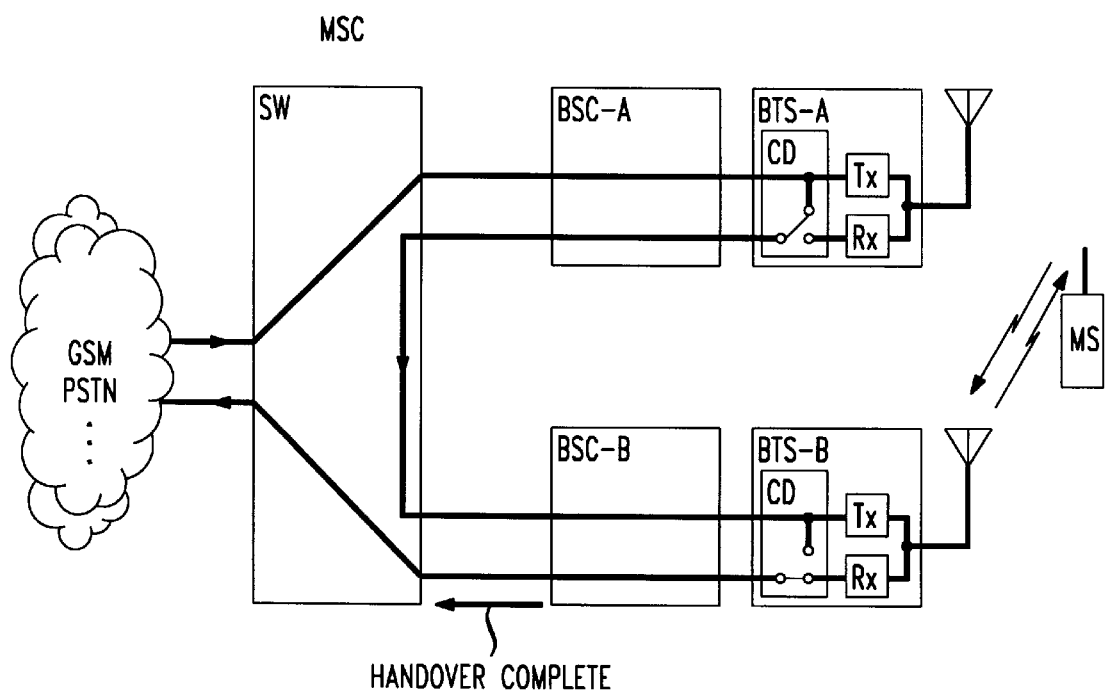
Figure 5I:
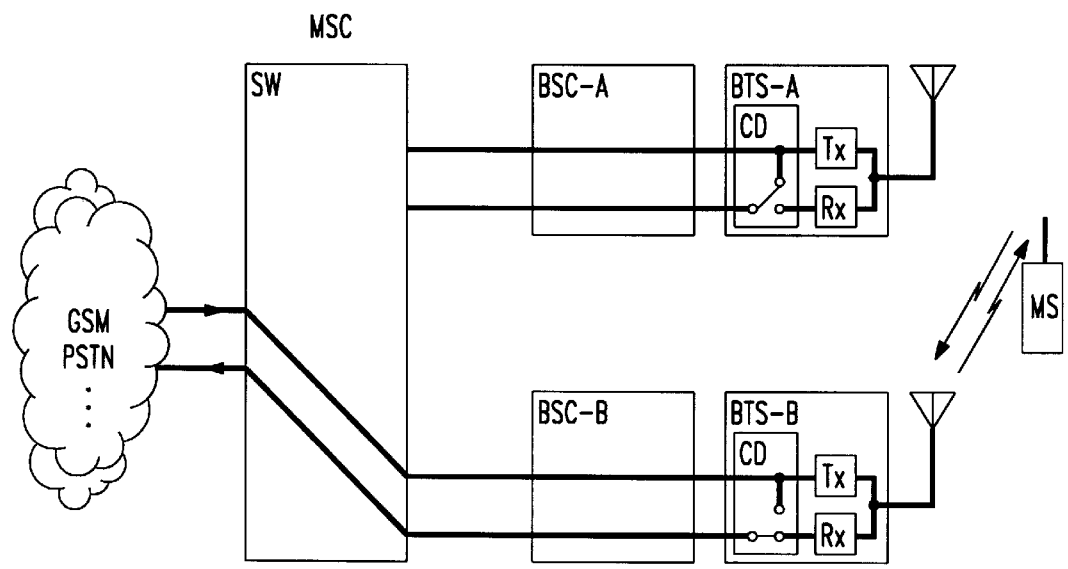
Figure 5J:
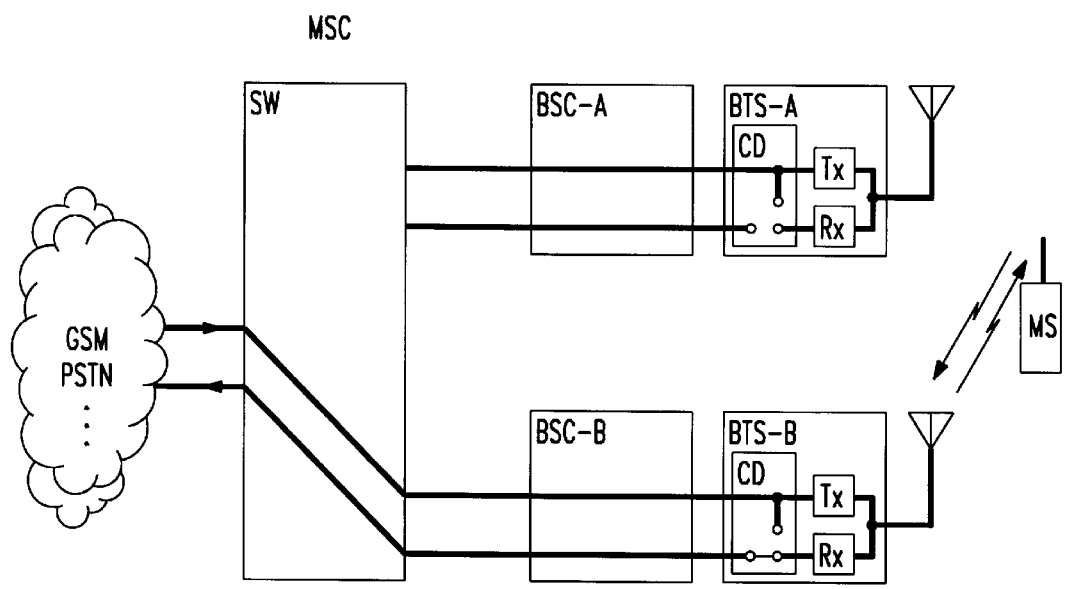

As has also already been described, the decoding of the "handover command" in the base station BTS-A causes the data received from the respective mobile subscribers to be returned to the base station controller BSC-A. As a result of the "handover command", the mobile subscriber station MS changes to the new radio channel of the call take-over base station BSC-B. Since the mobile subscriber station accesses the call take-over base station BSC-B, as has already been described, the coupling between the incoming and outgoing data streams in the base station is cancelled, so that the incoming data stream is sent to the mobile subscriber station MS via the transmitter unit TX of the call take-over base station, and the data stream coming from the mobile subscriber station MS is sent towards the mobile switching centre MSC via the receiver unit RX (FIG. 5h).

Henceforth the switching means CD in the call handover base station BTS-A has closed the loop from the network subscriber to the call handover base station in two directions, while the signal looped through to the call handover base station is conveyed to the call take-over base station BTS-B via the still existing call preparing circuit of the switch SW of the mobile switching centre MSC. In this manner the dead time noticeable by the subscribers during the call handover on the radio link is limited to the time between the command to the mobile subscriber station to change radio channels and the access of the mobile subscriber station to the call take-over base station, because in the described manner there is no need to carry out switching operations in the switch SW itself during the call handover.

After a successful call handover, the call take-over base station controller BSC-B sends out an acknowledgement "handover complete" to the mobile switching centre MSC. In response to this command, the final route for the two directions of the call from the network subscriber to the call take-over base station BSC-B is switched back (FIG. 5$i$). Due to the still existing bridge circuit of the switch element in the call handover base station BTS-A, the instant at which the switching operation in the switch SW of the mobile switching centre becomes unimportant again. The switching operation itself requires very brief switch times, so that the two subscribers hardly notice anything of the switching operation.

As a result of the acknowledgement of the successful handover "handover complete", the mobile switching centre MSC breaks off the original link to the call handover base station controller BSC-A and this base station controller its link to the handover base station BTS-A (FIG. 5$j$). The handover is then accomplished.

The use of switching means between the switch of the mobile switching centre and the mobile subscriber station make it possible to divide the switching operation of the switch SW during a call handover into a switching operation before the handover and a switching operation after the handover. Since the switching operation in a switch SW itself can take place without a delay, the switching operations themselves cause practically no dead time. In addition, it is of no consequence whether, when the data stream is to be sent via the two base stations as described before, the data signal coming from the call handover base station is sent via the switch to the call take-over base station, or the data signal coming from the call take-over base station is sent to the call handover base station.

I claim:

1. A mobile radio system comprising at least a first base station, at least a further base station and at least a switching centre, wherein said mobile radio system further includes switching equipment arranged in each base station for inserting a signal ($S_k$) coming from said switching centre into a signal ($S_g$) going to said switching centre.

2. The mobile radio system as claimed in claim 1, wherein said switching equipment comprises a detection and control arrangement for detecting a request for a call handover and for controlling an insertion.

3. The mobile radio system as claimed in claim 2, wherein said switching equipment further comprises switching means for serially connecting the first and the further base station.

4. The mobile radio system as claimed in claim 3, wherein said switching centre comprises switching means which are provided for separately switching through the signal ($S_k$) coming from said switching centre and the signal ($S_g$) going to said switching centre when a call handover is effected.

5. The mobile radio system as claimed in claim 4, wherein, the switching means of said switching centre and the switching means of said switching equipment of said further base station are provided to switch a send signal, coming from a fixed network and to be sent to a mobile station, through to said first base station via said further base station after a request for a call handover, and further wherein, the switching means of said switching equipment of said first and of said further base station are provided to switch a receiving signal for a call handover received from the mobile station through to said further base station via the first base station, and still further wherein, the switching means of said switching centre are provided to switch the receiving signal received from the mobile station through to the fixed network.

6. A base station for a mobile radio system, the mobile radio system having at least a first base station, at least a further base station and at least a switching centre, said base station comprising switching equipment for inserting a signal ($S_k$) coming from the switching centre into a signal ($S_g$) going to the switching centre.

7. The base station as claimed in claim 6, wherein said base station further comprises a detection control arrangement for detecting a request for a call handover and for controlling an insertion.

8. The base station as claimed in claim 7, wherein said switching equipment further comprises switching means for serially connecting the first and the further base stations.

9. The base station as claimed in claim 8, wherein the switching means of said switching equipment of a further base station are provided to switch a send signal coming from a fixed network and to be sent to a mobile station through to a first base station via the further base station after a request for a call handover, further wherein the switching means of said switching equipment of the first and of the further base station are provided to switch a receiving signal for a call handover received from the mobile station through to the further base station via the first base station.

10. Switching equipment for a base station of a mobile radio system, wherein said switching equipment is provided for inserting a signal ($S_k$) coming from a switching centre into a signal ($S_g$) going to the switching centre.

11. The switching equipment as claimed in claim 10, further comprising a detection and control arrangement for detecting a request for a call handover and for controlling an insertion.

12. The switching equipment as claimed in claim 11, still further comprising switching means for serially connecting a first and a further base station.

* * * * *